June 19, 1956     I. WALLQUIST     2,751,087
MOVABLE BED TYPE FILTER FOR LIQUIDS
Filed April 14, 1954
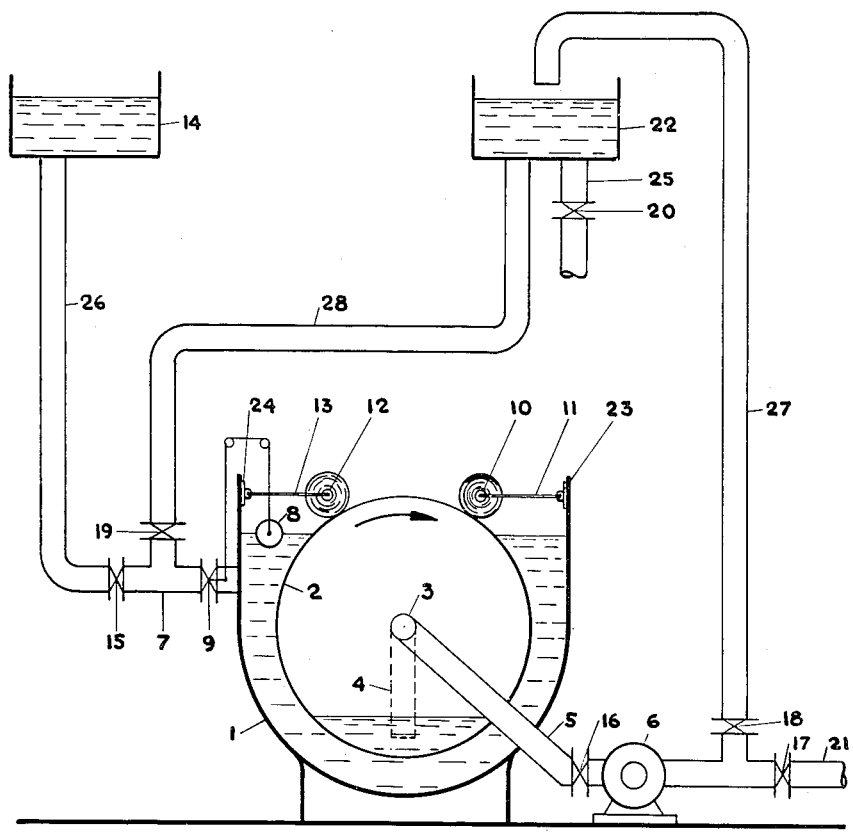
INVENTOR
IVAR WALLQUIST
By Linton and Linton
ATTORNEYS

United States Patent Office 2,751,087
Patented June 19, 1956

2,751,087

MOVABLE BED TYPE FILTER FOR LIQUIDS

Ivar Wallquist, Karlstad, Sweden

Application April 14, 1954, Serial No. 423,121

Claims priority, application Sweden April 18, 1953

2 Claims. (Cl. 210—199)

The present invention relates to methods for filtration of liquids with the use of a filtering drum rotating in a vat and a filtering material band continuously advanced in the rotation of said drum and movable with the mantle of the drum, said band during the filtration being wound off from a shaft and at the same time wound up on a second shaft and the liquid by pressure being caused to pass through a portion of the filtering material band around a portion of the mantle of the drum into the latter. In a prior method of this kind the rollers of the filtering material band rotate freely from the filtering drum, and in this prior method the tensile strength of the band must be strained in the driving of the rotating members contacting the band. This necessitates that said band must have a certain minimal tensile strength, and this fact involves a restriction in choice of the material for the band. Above all, filtering material bands of cheap quality, such as ordinary filter paper, are excluded since such a material in wet condition has an extremely small tensile strength. According to the present invention, the filtering material band roller on the wind-off shaft and the filtering material band on the wind-up shaft are, independent of the diameters of said rollers during the filtration, simultaneously held in direct contact with the mantle of the filtering drum above the surface of liquid in the vat and are driven by the contact of said rollers with the drum with the same circumferential speed as the drum when the filtering material band at the rotation of the drum is continuously wound off from the wind-off shaft, moved around the lower part of the drum operative in the filtration and wound up on the wind-up shaft.

By this method, above all, the advantage is attained that the driving of the filtering drum as well as of the wind-up and the wind-off shafts will not be dependent of a certain minimal tensile strength of the filtering material band. Thus, if suitable in other respects, one may choose filtering material bands with very low tensile strength, particularly in wet condition, such as ordinary filter paper.

The invention will be made more clear by the following description with reference to the accompanying drawing showing diagrammatically by way of an example an arrangement for carrying out the present method. In this drawing 1 denotes a basin, container or vat in which a filtering drum 2 is rotatably provided. The mantle or jacket of the drum consists of perforated plate or wire cloth laid over such plate or over ribs, or the drum mantle is in any other way perforated. The drum is more or less open at one or both ends for the discharge of the filtered liquid through a pipe or tube 3, or the interior of the drum by means of pipes or tubes 4 and 5 may be connected with a suction device 6 for drawing out the filtrate of the liquid to be purified from the drum. For increasing the filtering rate the level of the filtrate within the drum may be kept low and thereby the difference between the levels of the unfiltered and filtered liquid be kept high, or the drum may be arranged as vacuum filter drum, in which case the suction device 6 sucks the filtrate from the interior of the drum through the pipe 5 as previously known. The liquid to be filtered is supplied to the vat 1 through a pipe or tube 7, and the level in said vat may be kept constant by a float 8 regulating a throttle valve 9 in the supply pipe or tube 7.

The filtering material band, which is a little wider than the mantle of the drum, before use is wound up in desired length and diameter of the roller on a shaft 10, which may be tubular and is kept in such a position by arms 11, one at each end of the shaft 10 and pivotal in bearings 23, that the shaft is always parallel with the longitudinal or rotation axis of the drum 2, and the roller of the filtering material band is wound off on the mantle of the drum 2. The filtering material band is fed from the shaft 10 down on and around a portion of the drum 2 in its direction of rotation because the driven drum rotates the rollers of the filtering material band. According to consumption the filtering material band is wound up on the shaft 12, which may be tubular and as the shaft 10 is parallel with the axis of the drum and is kept in such a postion by arms 13, one at each end of the shaft 12 and pivotal in bearings 24. Thus, both the filtering material band roller on the wind-off shaft 10 and the filtering material band roller on the wind-up shaft 12 are independent of the diameters of said rollers, during the filtration kept in direct contact with the mantle of the drum 2 above the liquid surface in the vat and are driven by said contact with the same circumferential speed as the drum.

The filtering material band rollers on the shafts 10, 12 are, with suitable pressure, held in contact with the drum 2 either by the weight of the shafts and rollers and/or by means of spring pressure or similar means.

The method according to the present invention in its details may be varied as exemplified by the following:

(1) A certain quantity of liquid for example liquid contained in a tank 14 connected with the inlet conduit 7 by a conduit 26 and a valve 15, is to be filtered only a single time and discharged after filtration. Said valve 15 and the valves 16 and 17 in the discharge conduit 5, 21 are open.

Valves 18, 19 in conduits 27 and 28 respectively connecting the discharge conduit 5, 21 and the inlet conduit 7 with a second tank 22 are closed. Thus the filtrate escapes through the discharge conduit 5, 21. The drum rotates, and the operative portion of the filtering material band is renewed continuously. The capacity and the degree of purification is dependent of the tightness of the filtering material and the speed of rotation of the drum.

(2) The liquid from the tank 14 is filtered and conducted, for example, through the pipe 27 to the tank 22 which has a discharge pipe or tube 25 with a valve 20 for drainage of the finished filtrate. The valves 15, 16 and 18 are open and 17, 19 and 20 are closed. The drum rotates and thus the operative portion of the filtering material band is renewed continuously. When all liquid has left the tank 14, the valve 15 is closed and the valve 19 is opened. The liquid will then circulate between the filter and the tank 22, and the filtration of the liquid can be continued until the desired degree of purification has been obtained. In this way, after sufficient time, a filtrate entirely free from solid particles can be obtained. The capacity of the filter and reduction per unit of time of the quantity of filtrable particles in the liquid are dependent on the tightness of the filtering material and the speed of rotation of the drum.

In each of above modes of the filtration for a certain filtering material the capacity and purification per unit of time may be varied within very wide limits by variation of the speed of rotation of the drum, i. e. the rate of renewal of the operative portion of the filtering material band.

The material of the filtering band may be suitable for filtration and from which a band-shaped filtering web can be formed by felting, weaving or in other similar ways. Such material may be used as filtering paper of cellulose or asbestos, cloths of metal wire, asbestos or fibres of inorganic or organic origin such as wool, cotton, artificial silk, plastics et cetera according to the physical and chemical properties of the liquid to be filtered and of the solid particles in the liquid.

What I claim is:

1. Apparatus for the filtration of liquids comprising a driven drum having a filtering peripheral surface, a vat having said drum rotatably mounted therein and supplied with liquid to be filtered, a band of filtering material, a supply shaft having a portion of said band wound thereon with the roll of said band being in contact with said drum for being rotated thereby at the same circumferential speed, a receiving shaft having a further portion of said band wound thereon with the roll of said band also being in contact with said drum for being rotated thereby at the same circumferential speed, means for maintaining said rolls in contact with said drum, said shafts being rotatably mounted above the liquid to be filtered with said band extending therefrom and moving around the filtering periphery of said drum beneath said liquid with the rotation of said drum and means for withdrawing filtered liquid from the interior of said drum to the exterior of said vat.

2. An apparatus for the filtration of liquids comprising, in combination, a driven drum having a liquid-pervious mantle, a vat in which said drum in rotatably mounted, a supply to said vat for the liquid to be filtered, at least one end of said drum being provided with a discharge for the filtrate from said liquid, a filtering material band adapted to be continuously advanced in the rotation of said drum, a wind-off shaft for a roll of said band, a wind-up shaft for a second roll of said band, said band during the filtration being adapted to be wound off from said filtering material band roll on said wind-off shaft and at the same time to be wound up on said filtering material band roll on said wind-up shaft, said wind-off and wind-up shafts with the filtering material band rolls carried thereby being parallel with the axis of said drum and movable in parallel relation to said axis to and from the mantle of said drum, means causing the filtering material band roll on said wind-off shaft as well as the filtering material band roll on said wind-up shaft, independently of the diameters of said rolls during the filtration, to be held simultaneously in direct contact with the mantle of said filtering drum above the surface of the liquid in said vat with both of said rolls adapted to be driven by the contact of said rolls with the mantle of said drum with the same circumferential speed as that of said drum whereby said filtering material band at the rotation of said drum is continuously wound off from said wind-off shaft, moved around the lower portion of the mantle of said drum, and wound up on said wind-up shaft with the filtrate by pressure being caused to pass through the portion of said band around said lower portion of the mantle of said drum into the latter and discharged through said discharge from said drum.

References Cited in the file of this patent

FOREIGN PATENTS

| 22,852 | Great Britain | 1901 |
| 16,779 | Great Britain | 1910 |
| 16,852 | Australia | June 12, 1929 |